F. HAUSMANN.
PROCESS OF CONCENTRATING NITRIC ACID.
APPLICATION FILED SEPT. 9, 1913.

1,115,192.

Patented Oct. 27, 1914.

Witnesses:
Alfred R. Anderson
Frank H. Logan

Inventor:
Fritz Hausmann
by his Atty.

UNITED STATES PATENT OFFICE.

FRITZ HAUSMANN, OF MANNHEIM, GERMANY, ASSIGNOR TO THE FIRM OF VEREIN CHEMISCHER FABRIKEN IN MANNHEIM, OF MANNHEIM, GERMANY.

PROCESS OF CONCENTRATING NITRIC ACID.

1,115,192.  Specification of Letters Patent.  Patented Oct. 27, 1914.

Application filed September 9, 1913. Serial No. 788,890.

*To all whom it may concern:*

Be it known that I, FRITZ HAUSMANN, engineer, a subject of the King of Prussia and the German Emperor, residing at Käferthalerstrasse 246, Mannheim, Grand Duchy of Baden, German Empire, have invented a new and useful Improvement in Processes of Concentrating Nitric Acid; and I do hereby declare the following to be a full, clear, and exact description of the same.

High percentage nitric acid or nitric acid monohydrate is in considerable demand for many manufacturing purposes and in order to meet this demand, a mixture of sulfuric acid and nitric acid has been introduced in a definite quantity into a distilling vessel and distilled under a high vacuum, as in the Valentiner process which does not operate in a continuous manner and yields a nitric acid containing at most from 96 to 98 per cent. $HNO_3$ with a content of 0.5 per cent. and more of $N_2O_4$ and a considerable amount of weak acid. Owing to this process not being continuous, it necessitates a heavy consumption of coal and great wear of the apparatus and the use of a high vacuum makes the apparatus complicated and requires great attention so that the cost of manufacture by such process is very high.

I have found that from a mixture of sulfuric acid and nitric acid, highly concentrated nitric acid and nitric acid monohydrate can be manufactured almost free from impurities in a continuous manner and without the use of a high vacuum.

According to this invention the mixture of acids is led through the distilling apparatus in a thin layer continuously moving forward while at the same time air (or equivalent gas or gases) is passed through the apparatus in the direction toward the outlet for the vapors of nitric acid, so that the air, or gas, or gas mixture carries off with it the vapors of nitric acid. The air, or gas, or gas mixture, thus used is preferably previously dried. The path which the mixture of acids takes through the apparatus, is made as long as practicable.

The way in which the invention can be performed will be readily understood from the following description with reference to the accompanying drawing which shows an apparatus suitable for carrying out the invention, but the invention is not limited to the use of the precise form of apparatus illustrated.

Figure 1:
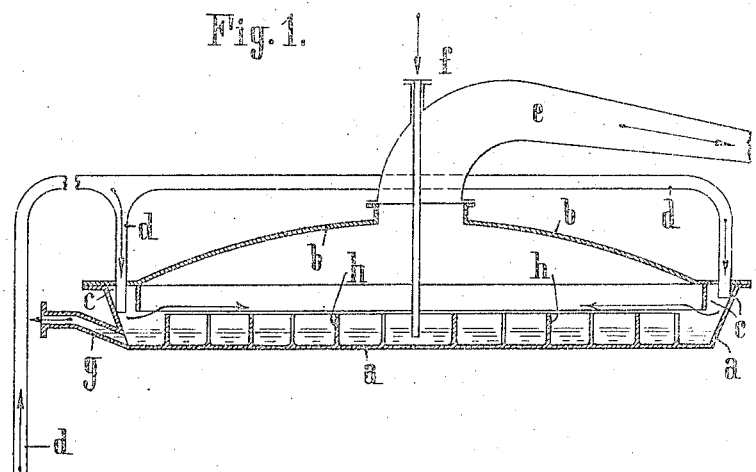
Figure 2:
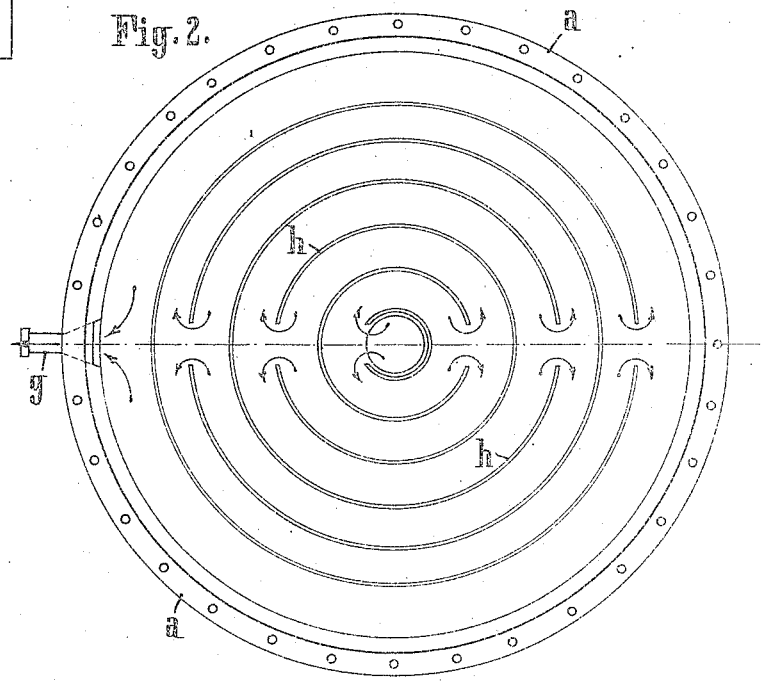

In the drawing Figure 1 shows a vertical section and Fig. 2 a plan of an apparatus suitable for carrying out the process.

The still is as low as possible and is preferably dish shaped so that only the bottom $a$ requires to be heated. The cover $b$ rests freely in place and is cooled by the surrounding air, or any suitable cooling means, such, for instance, as cold gases. This cooling favors the retaining of any vapors of sulfuric acid, so that the nitric acid obtained is free from sulfuric acid. The mixture of acids is preferably introduced through the central tube $f$ and the residual acid passes off by the outlet pipe $g$. The supply is so effected that the mixture of acids is freed as much as possible from nitric acid when it leaves the apparatus. The inlet is preferably arranged at the part of the path which is most distant from the outlet, so that the mixture has to run over the longest path before it reaches the outlet. The depth of the layer of liquid is preferably maintained at not more than from 30 to 40 millimeters so that a saving of fuel will be obtained, owing to no unnecessarily high column or depth of liquid (about 1000 millimeters in Valentiner's process) having to be heated. A prolonged path of the mixture of acids through the apparatus is formed by guiding channels $h$. The pipes $d$ supply air or other gas, or gas mixture, to the apparatus. The cover $b$ is preferably provided with a depending rim $e$ which is peripherally adjusted to it as shown in the drawing and which extends down to the level of the liquid, or dips a little into it. By the arrangement of the rim $e$ the supply of air, or the like, takes place as uniformly as possible and, passing over the surface of the liquid, carries away with it the nitric acid vapors and at the same time cools the liquid, thereby accelerating the distilling operation, preventing decompositions of the nitric acid and favoring the recondensation of sulfuric acid. The air, or the like, and nitric acid vapors are led away through the tube $c$ and the nitric acid vapors are condensed in any suitable condenser.

In comparison with the processes working with a vacuum, the condensing devices are greatly simplified and may consist, for instance, of refrigerating worms with collecting devices and towers.

The draft required in the apparatus can be produced by a chimney, or by regulatable suction fans at the end of the condensing device.

A circular shape is most convenient for the distillation vessel, but other forms such for example as polygonal, or elliptical, may be used.

The yield of this apparatus is more than double that of an apparatus operating with a vacuum and of equal bottom area, and even five times as much as in aforesaid apparatuses comparing the total heating area.

In addition to very highly concentrated acid or monohydrate only a small part of weak acid is obtained and this being perfectly free from $N_2O_4$ can be maintained at a concentration of 85 to 90 per cent. $HNO_3$.

The advantages of the process according to this invention are that acid of concentration up to monohydrate is obtained, that the operation is continuous and that in contradistinction to the intermittent working, the temperature can be maintained uniform both in the still and in the condensation and collecting device. By this means the heat is very efficiently utilized and consequently the coal consumption is low, while the apparatus is very durable and requires but small repairs and the operation is greatly simplified and easily carried out.

I claim:

1. The process of manufacturing very highly concentrated nitric acid up to monohydrate and free from nitrous acid and lower oxids of nitrogen which consists in heating a mixture of sulfuric acid and nitric acid in one thin layer in a distillation apparatus, moving the heated mixture horizontally in a continuous stream forward through the distillation apparatus while cold gases not decomposing nitric acid are passed over the surface of the heated mixture, and leading the fumes of nitric acid with the gases out of contact with the remaining sulfuric acid.

2. The process of manufacturing very highly concentrated nitric acid up to monohydrate and free from nitrous acid and lower oxids of nitrogen which consists in heating a mixture of sulfuric acid and nitric acid in one thin layer in a distillation apparatus, moving the heated mixture horizontally in a continuous stream forward through the distillation apparatus while cold air is passed over the surface of the heated mixture and leading the fumes of nitric acid with air out of contact with the remaining sulfuric acid.

3. The process of manufacturing nitric acid monohydrate free from nitrous acid and lower oxids of nitrogen which consists in heating a mixture of sulfuric acid and nitric acid in one thin layer in a distillation apparatus, moving the heated mixture horizontally in a continuous stream forward through the distillation apparatus while cold air previously dried is passed over the surface of the heated mixture and leading the fumes of nitric acid with air out of contact with the remaining sulfuric acid.

In testimony whereof, I have signed my name to this specification in the presence of two subscribing witnesses.

FRITZ HAUSMANN.

Witnesses:
JOSEPH PFEIFFER,
HEINRICH REIGER.